July 15, 1947.　　J. S. PECKER ET AL　　2,424,050
LIQUID STARCH COMPOSITIONS AND METHOD OF PREPARING THE SAME
Filed April 9, 1943
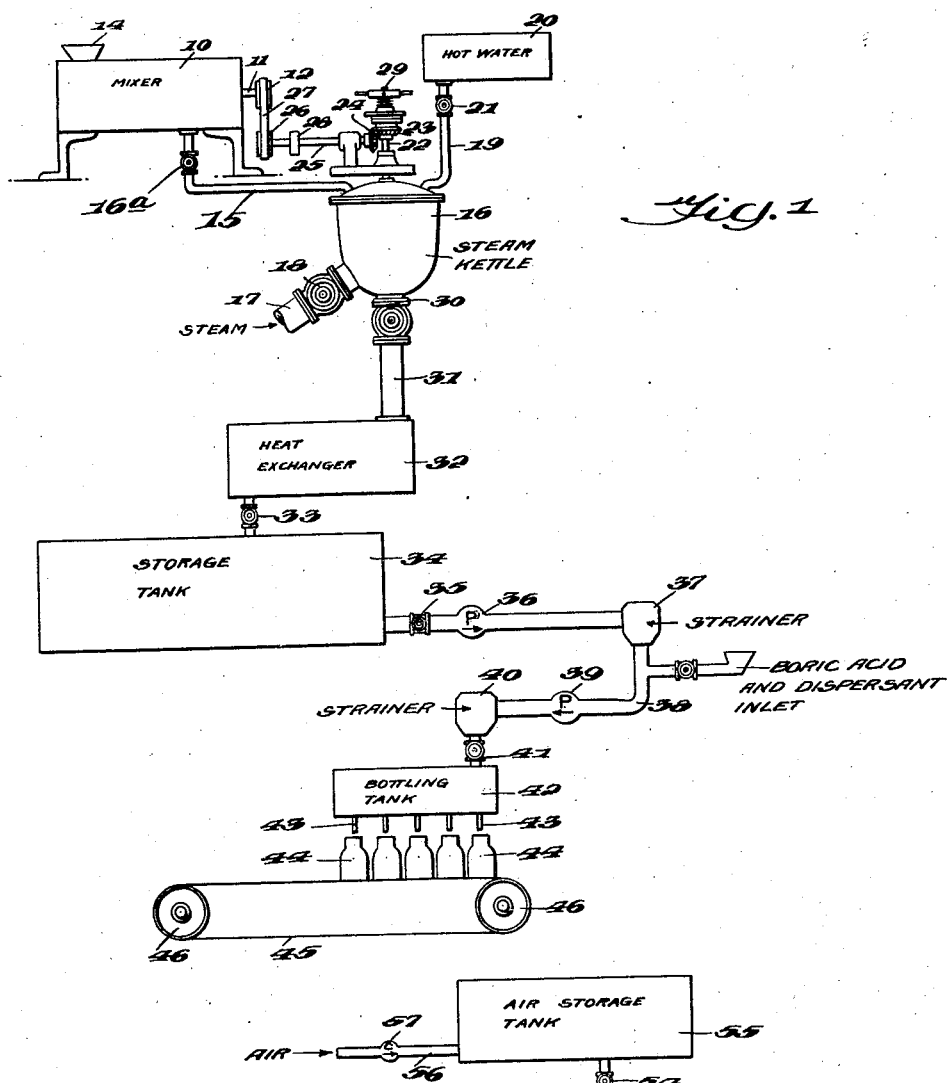
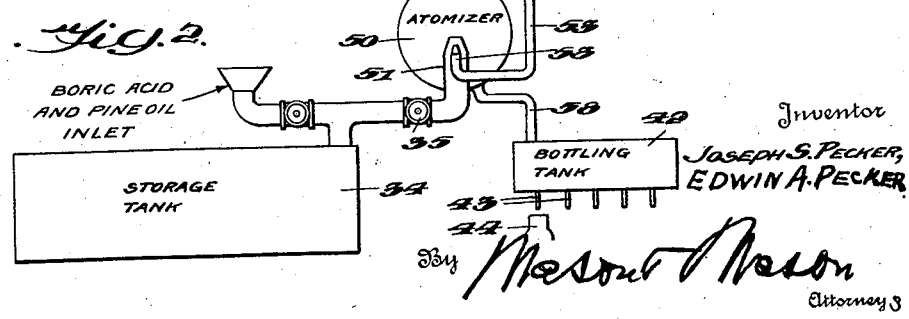
Inventor
Joseph S. Pecker,
Edwin A. Pecker
By
Attorneys Patented July 15, 1947

2,424,050

UNITED STATES PATENT OFFICE 2,424,050

LIQUID STARCH COMPOSITIONS AND METHOD OF PREPARING THE SAME

Joseph S. Pecker and Edwin A. Pecker, Philadelphia, Pa., assignors of one-half to Anne G. Pecker, Philadelphia, Pa.

Application April 9, 1943, Serial No. 482,445

25 Claims. (Cl. 106—214)

1

This invention relates to the manufacture of liquid starch mixtures and, in particular, to the provision of a new and improved method for the production of mixtures of this type and to apparatus particularly adapted for the accomplishment of the aforesaid method.

It is an object of this invention to provide a new and improved method for manufacturing liquid starch mixtures for use in laundering, as commercial sizings, etc., and particularly such mixtures having bluing therein wherein the mixture is free from lumpiness and is possessed of uniform penetrating powers, wherein the mixture is of uniform consistency, wherein the mixture is rendered stable and free from regelling, and wherein fading of the bluing is prevented.

It is a further object of this invention to provide such a method wherein the antiseptic and dispersant pine oil with a suitable amount of boric acid is added to the liquid starch which is aged for a suitable time to form a gel before being subjected to the first stage of a multi-stage operation mechanically breaking the gel into fine particles of uniform size and wherein the mixture is subjected to a multi-stage straining operation adapted to distribute the dispersant uniformly throughout the mixture, and to break up the mixture into small particles subjected to aeration to form a completely stable, homogeneous, bacteriostatic mixture.

It is a further object of this invention to provide an alternative method utilizing atomization to break up the aged mixture, after the addition of the dispersant and boric acid, into such fine particles, in the presence of air, as effectively to prevent regelling thereof while effectively distributing the dispersant therethrough, and subjecting the dispersant and finely divided particles to air effectively vaporizing surplus dispersant and supplying oxygen sufficient to satisfy the high oxygen demand of the starch mixture, when it contains bluing, effectively to prevent fading of the bluing by preventing uptake of oxygen from the bluing by the starch.

It is a further object of the invention to provide apparatus particularly adapted to the accomplishment of the above methods.

These and other objects and advantages of the invention will appear more fully from the following description taken in conjunction with the drawing.

In United States Letters Patent No. 2,228,784, granted January 14, 1941, to Simon Spilka, a liquid starch composition is described and claimed. This starch mixture contains bluing, sodium fluoride as a preservative and pine oil as a dispersant.

In our copending application Serial No. 482,444, filed April 9, 1943, we have disclosed the discovery of the fact that the pine oil is an effective antiseptic and renders the mixture bacteriostatic. Many organisms in the starch mixture are killed outright, while the growth in others is inhibited. It functions further as an aid in ironing clothing starched with the mixture since it functions as a lubricant preventing "gumming" or "sticking" of the iron to the starched clothing.

In addition to the omission of sodium fluoride as described in the aforesaid copending application, it is proposed by us to prevent fading of the bluing by the addition of boric acid to the mixture after the first stage of a multi-stage mechanical straining operation, or before atomization thereof, and also by the repeated mechanical break-up of the mixture by multi-stage straining or atomization for presenting the mixture, in finely divided particles, to air to prevent fading which normally occurs when such mixtures as that disclosed in the aforesaid Spilka patent are bottled, since the "oxygen hungry" starch mixture "steals" oxygen from the bluing, which is a substance having lesser affinity for oxygen than does the starch mixture.

The hydrolysis products of starch have an inherent demand for oxygen. This demand causes uptake of oxygen from air in the starch containers and other substances having lesser affinity for oxygen than does the starch mixture. Dyes in common laundering bluing are such substances, which accounts for the gradual loss of color of bluing introduced into liquid starch when manufactured. The introduction into liquid starch of boric acid partially satisfies this demand, thus preventing or blocking oxygen uptake by the starch mixture from the bluing and protecting the bluing against loss of color.

The cooking of starch to a precise degree of heat and length of time is impossible, and therefore a certain amount of overcooking is unavoidable. This overcooking causes a hydrolysis action which has a tendency to take up oxygen, and if the amount of material is not sufficient to absorb the oxygen, may cause a break-up of the material. Therefore, the supplying of boric acid provides the medium whereby the oxygen demand is satisfied.

The supply of oxygen through aeration in a multi-stage, mechanical straining operation or in an atomizing operation, protects the bluing against loss of color by aiding the boric acid in eliminating the giving up of oxygen by the bluing to the starch mixture.

According to the principles of this invention, a cold mixture of a thin boiling cornstarch as set forth in the Spilka patent above noted and water in the ratio of substantially 12 ozs. of starch to 1 qt. of water is mixed with boiling water in the ratio of approximately 3 qts. of boiling water to 1 qt. cold water and is stirred at approximately 100° C. for a suitable time, as for instance, approximately three minutes. The mixture is then cooled to approximately 70° C.

Corn starch granules begin to rupture and gelatinize at approximately 70° C. The rupture of most granules in the mixture takes place almost instantaneously when the mixture reaches this temperature, but a temperature of approximately 100° C. produces a starch more free of undissolved granules than do lower temperatures. Such a temperature has been found necessary to avoid granular specks in the finished products. While cooking at such temperature for approximately three minutes destroys most microorganisms, it does not destroy all microorganisms, especially spore formers. For this reason a preservative must be added before packaging since the spore forming activity must be arrested before a suitably stable product can be produced. Furthermore, the cooling of the mixture may be accompanied by infection of the mixture from the air by live organisms which would continue to grow freely in the absence of germicides in the mixture. For this reason the germicide or antiseptic pine oil, is added, as hereinafter described, after the spore forming organisms in the mixture have completed their activity during aging of the cooled starch mixture, but it is to be understood that the pine oil may be added at any time after cooking provided the starch is reduced to a temperature sufficiently below the vaporizing point of the pine oil. Boric acid may also be added at some reasonable temperature prior to pouring into the tank for aging.

A suitable bluing, for instance Prussian blue, in the ratio of approximately 7 cc. per gallon of mixture may be added either before or after the cooling of the mixture.

The mixture with added bluing is aged in a storage tank or the like for a substantial length of time, preferably not less than twenty-four hours and up to seventy-two hours. This aging will cause the mixture to form a gel.

The starch mixture delivered for aging to the storage tank forms a complex gel containing, along with the properly cooked ruptured starch granules, the products of overcooked granules. These overcooked granules are undergoing further hydrolysis, with consequent reduction of viscosity below that of the properly cooked granules. Aging permits this hydrolysis to continue substantially to its end or completion, and the action of any spore formers to be substantially completed before discharge of the starch mixture from the storage tank upon the completion of the aging step. In other words, the spore formers shall have become substantially inactive and the mixture will contain substantially no latent spore forming organisms, or will be inert in this respect, before it is subjected to the first stage of the multi-stage straining operation, or alternatively, to atomization.

After its discharge from the storage or aging tank the gel is subjected to mechanical straining in the first stage of a multi-stage straining operation, which mechanically breaks up the gel into extremely fine particles. A dispersant and preservative or antiseptic, preferably pine oil, in the ratio of approximately 15 grams to 1 gallon of mixture, is added with a suitable amount of boric acid partially to satisfy or prevent oxygen uptake by the mixture, thus preventing fading of the bluing. From 10 gm. to 20 gm. of powdered boric acid per gallon of starch mixture has been found to be a suitable amount.

Thereafter, the mixture including bluing, pine oil and boric acid is subjected to a second stage of the multi-stage straining operation, which further mechanically breaks up the particles and uniformly distributes the pine oil through the mixture, thus increasing its effectiveness as a preservative, while aiding evaporation of surplus pine oil to remove objectionable odors.

Alternatively, the multi-stage straining operation may be omitted and an atomizing operation substituted therefor. In such case, the pine oil and boric acid will be introduced into the gel before it reaches the atomizer.

In the drawing:

Fig. 1 is a diagrammatic view of apparatus particularly adapted for carrying out the method of this invention embodying a multi-stage straining device; and Fig. 2 is a diagrammatic view of an atomizing device adapted to break up the aged starch mixture into fine particles and supply the oxygen demand thereof to prevent fading of the bluing in the starch mixture.

Referring to the drawing in detail, illustrative apparatus for carrying out the method of this invention is shown in Figs. 1 and 2. In the first embodiment, illustrated in Fig. 1, the mixer 10 comprises a tank having rotary agitating or mixing means therein driven by the shaft 11 and pulley 12. Starch and cold water are admitted to the mixer through the hopper 14, and the mixer is operated to mix the starch and cold water for a predetermined time. The starch passes thence through the pipe 15, controlled by valve 16a, to the steam kettle generally designated 16. The steam kettle is provided with a steam jacket having steam supplied thereto through the steam inlet 17 through the control valve 18. The pipe 15 leads into the top or lid of the steam kettle 16, as does also a pipe 19 leading to the hot water tank 20 from which hot water is supplied to the interior of the steam kettle 16 under the control of the valve 21 and is mixed with the mixture supplied through the pipe 15.

On the interior of the steam kettle is a rotary agitator fixed to the rotor shaft 22, which rotor shaft 22 is rotated through the spur gear 23 by the spur gear 24 on a shaft 25. The shaft 25 is operatedly connected with the above-described shaft 11 through a pulley 26 thereon which is connected by the belt 27 with the above-described pulley 12 on the shaft 11. This provides a common drive between the shafts 11 and 25 from any suitable prime mover rotating the pulley 28 fixed on the shaft 25.

An adjustable overload clutch mechanism 29 is provided between the spur gear 23 and the shaft 22, the details of this clutch mechanism being fully described in the copending application of Joseph S. Pecker, Serial No. 469,951, filed December 23, 1942.

The mixture of starch and cold water supplied to the interior of the steam kettle 16 through the pipe 15 and the hot water supplied through the pipe 19 are mixed and heated, preferably above 100° C., respectively, by the agitator on the rotor shaft 22 and the steam jacket of the steam kettle 16 under the control of the steam inlet valve 18.

When this heating, or cooking, has proceeded for a suitable length of time, for instance approximately three minutes, the steam inlet valve 18 is closed and the dump valve 30 is opened to permit flow of the heated contents of the steam kettle 16 through the outlet 31 to the heat exchanger 32. It is, of course, understood that the valves 16a and 21 are closed during operation of the steam kettle, as is also the valve 30, the valve 18 being open to control the admission of steam to the steam jacket of the steam kettle.

When the cooked mixture flows from the steam kettle 16 to the heat exchanger 32, the valve 30 is closed and the mixture is brought to the desired temperature in the heat exchanger, for instance, approximately 70° C., whereafter the heat exchanger outlet valve 33 is opened to admit the cooked and cooled liquid starch mixture to the storage tank 34. The mixture is retained or "aged" in the storage tank 34 for a predetermined time, preferably between twenty-four and seventy-four hours, the valve 33 being closed after its flow from the heat exchanger 32.

After sufficient aging of the liquid starch mixture has occurred, the starch tank outlet valve 35 is opened and the pump 36 is put into operation to force the aged liquid starch mixture through the first or first-stage strainer 37 wherein it is mechanically broken up into small particles with consequent admission of oxygen to these small particles. Thereafter, the particles thus broken up in the first-stage strainer 37 pass through the pipe 38 to a second pump 39, which forces the mixture, to which pine oil and boric acid may be here added, through the second-stage strainer 40 wherein it is further broken up into fine particles of uniform size. In the strainers 37 and 40 the mixture is preferably subjected to the straining of 20 mesh strainer screens.

The proportion of pine oil may be from 5 to 40 grams of pine oil to one gallon of the mixture of starch and bluing, and the boric acid may vary from 2 to 30 grams per gallon of the mixture of starch and bluing.

It has been stated that the pine oil and boric acid may be added during the interval following the first-stage straining step and before the second-stage straining step, but it has been found that the pine oil may be added at any time after cooling of the starch, provided the starch is reduced to a temperature sufficiently below the vaporizing point of the pine oil. The boric acid may also be added at some reasonable temperature prior to pouring of the mixture into the tank for aging.

From the second-stage strainer 40 the twice broken up mixture passes through the valve 41 to the bottling tank 42. The bottling tank 42 has a number of pipes or nozzles 43 extending therefrom to supply the liquid starch mixture to bottles 44 supported on a suitable conveyor such as the endless belt conveyor comprising the belt 45 and supporting pulleys 46, one of which is driven in suitable manner at desired speed.

In the second embodiment illustrated in Figure 2, the pumps 36 and 39 and strainers 37 and 40 are omitted and an atomizing device is substituted therefor. This atomizing device comprises an atomizer chamber 50 having therein a Venturi tube 51 connected through the valve 35 to the storage tank 34 and an air jet 52 disposed within and concentric with the Venturi tube 51. The air jet 52 leads through the air inlet pipe 53 and air inlet control valve 54 from an air storage tank 55 to which air is supplied under predetermined pressure through the pipe 56 by the air compressor 57. The atomizer outlet pipe 58 leads from the chamber of the atomizer 50 to the above described bottling tank 42 which is provided, as above described, with a plurality of pipes or nozzles 43 through which the broken up or atomized liquid starch mixture is supplied to bottles 44.

Advantages of the above described atomizer are freedom from clogging, freedom from variation in size of particles produced, and obviation of the necessity of frequent cleaning and servicing, i. e., there are no screens to become clogged, no orifices which may become partially obstructed to vary the size of particles passing therethrough. Further, control of the size of particles produced may be achieved by variation of the pressure of air supplied to the atomizer.

Thus, by the structure of this embodiment, the aged liquid starch mixture in gel form, after the addition of pine oil and boric acid, is drawn through the Venturi tube 51 by the air passing through the air jet 52 and is mechanically broken up into small particles without uptake of oxygen from the bluing because of the oxygen uptake blocking action of the boric acid, and because of the oxygen given up by the large amount of air to which the small particles are subjected. After the atomization without uptake of oxygen from the bluing, these particles unite and are carried through the pipe 58 to the bottling tank 42, from whence they are placed in suitable bottles or jars 44.

This mixture is stable since the fine particles formed after the gelling occurring during aging will not coalesce. Since sufficient oxygen to supply its demands has been supplied by the addition of uptake blocking boric acid and by the aeration incident to mechanical straining, or atomization, it will not take up or withdraw oxygen from the bluing and fading will thus be prevented.

It is of course to be understood that the above description is merely illustrative and is in no wise limiting and that we desire to comprehend within our invention all modifications and alternatives which are fairly embraced in the appended claims and in the invention.

Having thus fully described our invention, what we claim as new and patentable and desire to secure by Letters Patent is:

1. In a method of manufacturing liquid starch, cooking a mixture of corn starch and water at a temperature and for a time sufficient to cause rupture of substantially all starch granules, adding bluing to the starch mixture of the type which has less affinity for oxygen than does the mixture of corn starch and water, cooling the mixture to a temperature sufficiently low to cause gelatinization thereof, mechanically breaking up said gel into fine particles, supplying air to said finely divided particles, supplying pine oil and boric acid, and breaking up the mixture of said fine particles, pine oil and boric acid, in the presence of air, to distribute the pine oil and boric acid uniformly therethrough and to form fine particles subjected to the action of boric acid and the oxygen in the air to which they are subjected for saitsfying the oxygen demand of the starch mixture and preventing oxygen uptake by the starch mixture from the bluing and prevent fading, for forming a bacteriostatic, non-fading, stable mixture comprising finely divided particles which will not coalesce.

2. In a method of manufacturing liquid starch, cooking a mixture of starch and water at a temperature and for a time sufficient to cause rupture of substantially all starch granules, cooling the mixture to a temperature sufficiently low to initiate gelatinization thereof, adding bluing to said starch mixture of the type which has less affinity for oxygen than does the mixture of starch and water, breaking up said gel into fine particles, supplying air to said finely divided particles, supplying pine oil and boric acid to the finely divided particles of said starch mixture, and again breaking up the mixture of said fine particles, pine oil and boric acid, in the presence of air, to distribute the pine oil and boric acid uniformly therethrough and to form fine particles subjected to the action of boric acid and the oxygen in the air to which they are subjected to satisfy the oxygen demand of the starch mixture and to prevent oxygen uptake by the starch mixture from the bluing and prevent fading, for forming a bacterio-static, non-fading, stable mixture comprising finely divided non-coalescent particles.

3. In a method of manufacturing liquid starch, cooking a mixture of corn starch and water at a temperature and for a time sufficient to cause rupture of substantially all starch granules, cooling the mixture to a temperature sufficiently low to initiate gelatinization thereof and adding bluing comprising bluing of the type which has less affinity for oxygen than does the mixture of starch and water, aging said cooled starch mixture for sufficient time for substantial completion of hydrolysis of overcooked starch granules, mechanically breaking up said gel into fine particles, supplying air to said finely divided particles, supplying pine oil, boric acid and air to the finely divided particles of said starch mixture, and again mechanically breaking up the mixture comprising said fine particles, pine oil and boric acid, in the presence of air, to distribute the pine oil and boric acid uniformly therethrough and to form fine non-coalescent particles subjected to the action of boric acid and the oxygen in the air to which they are subjected to satisfy the oxygen demand of the starch mixture and prevent oxygen uptake by the starch mixture from the bluing to prevent fading and form a bacterio-static, non-fading, stable mixture comprising finely divided particles which will not coalesce.

4. In a method of manufacturing liquid starch, cooking a mixture of starch and water at a temperature and for a time sufficient to cause rupture of substantially all starch granules, cooling the mixture to a temperature sufficiently low to cause gelatinization thereof and adding bluing comprising bluing of the type which has less affinity for oxygen than does the mixture of starch and water, aging said gel for sufficient time at room temperature for substantial completion of hydrolysis of overcooked starch granules, mechanically breaking up said gel into fine particles, supplying air to said finely divided particles, supplying a dispersant and germicide comprising pine oil with boric acid to the finely divided particles of said starch mixture, and again mechanically breaking up the mixture comprising said fine particles, pine oil and boric acid, in the presence of air to distribute the pine oil and boric acid uniformly therethrough and to form fine particles subjected to the action of boric acid, pine oil, and the oxygen in the air to which they are subjected, for satisfying the oxygen demand of the starch mixture and preventing oxygen uptake by the starch mixture from the bluing to prevent fading.

5. In a method of manufacturing liquid starch, cooking a mixture of starch and water at a temperature and for a time sufficient to cause rupture of substantially all starch granules, adding bluing comprising Prussian blue in the proportion of approximately 7 cc. per gallon of starch mixture, cooling the mixture to a temperature sufficiently low to cause gelatinization thereof, aging said cooled starch mixture for sufficient time for substantial completion of hydrolysis of overcooked starch granules, supplying a dispersant and antiseptic comprising pine oil along with boric acid to the starch mixture, mechanically breaking up the mixture of starch, pine oil and boric acid into fine particles, in the presence of air, to distribute the pine oil and boric acid uniformly therethrough and to form fine particles subjected to the action of pine oil, boric acid and the oxygen in the air for supplying the oxygen demand of the starch mixture and preventing oxygen uptake by the starch mixture from the bluing and prevent fading.

6. The method defined in claim 5 wherein the mechanical breaking up of said mixture of starch, pine oil and boric acid in the presence of air is accomplished by atomization.

7. The method defined in claim 5 wherein the mechanical breaking up of said mixture of starch, pine oil and boric acid is accomplished by straining the mixture.

8. In a method of manufacturing liquid starch, cooking a mixture of approximately twelve ounces of starch to one gallon of water at a temperature of approximately 100° C. for approximately three minutes to cause rupture of substantially all starch granules, cooling the mixture to approximately 70° C. to cause gelatinization thereof, and adding bluing comprising bluing of the type which has less affinity for oxygen than does the mixture of starch and water in the proportion of approximately 7 cc. per gallon of starch mixture, aging said cooled starch mixture for from twenty-four to seventy-two hours for substantial completion of hydrolysis of overcooked starch granules, supplying a dispersant and germicide comprising pine oil in the proportion of approximately 15 gm. per gallon of starch mixture, supplying boric acid in the proportion of approximately 10 gms. to 20 gms. per gallon of starch mixture, and mechanically breaking up the mixture of said fine particles, pine oil and boric acid, in the presence of air, to distribute the pine oil and boric acid uniformly therethrough and to form fine particles subjected to the action of the pine oil, the boric acid and the oxygen in the air to which they are subjected for supplying the oxygen demand of the starch mixture and preventing oxygen uptake by the starch mixture from the bluing and prevent fading.

9. The method defined in claim 8 wherein the mechanical breaking up of said mixture of starch, pine oil and boric acid, in the presence of air, is accomplished by straining.

10. The method defined in claim 8 wherein the mechanical breaking up of said mixture of starch, pine oil and boric acid, in the presence of air, is accomplished by atomization.

11. The method defined in claim 8 wherein the mechanical breaking up of said mixture of starch, pine oil and boric acid, in the presence of air, is accomplished by repeated straining.

12. In a method of manufacturing liquid starch, cooking a mixture comprising twelve ounces of starch to one gallon of water at a temperature approximately 100° C. for approximately three minutes to cause rupture of substantially all starch granules, adding bluing comprising bluing of the type which has less affinity for oxygen than does the mixture of starch and water in the proportion of approximately 7 cc. per gallon of starch mixture, cooling the mixture to a temperature of approximately 70° C. to initiate gelatinization thereof, aging said cooled starch mixture for substantial completion of hydrolysis of overcooked starch granules, then mechanically breaking up said gel by straining into finely divided particles, supplying air to said finely divided particles, supplying a dispersant and antiseptic comprising pine oil in the proportion of from 5 to 40 grams per gallon of mixture, and boric acid in the proportion of from 2 to 30 grams per gallon of starch mixture, and again mechanically breaking up the mixture of said finely divided particles, pine oil, and boric acid by straining, to distribute the pine oil and boric acid uniformly therethrough and to subject the fine patricles to the antiseptic action of the pine oil and to the oxygenating action of the boric acid and the oxygen in the air to which they are subjected, for supplying the oxygen demand of the starch mixture and preventing oxygen uptake by the starch mixture from the bluing and prevent fading.

13. In a method of manufacturing liquid starch, cooking a mixture comprising approximately twelve ounces of starch to one gallon of water at a temperature approximating 100° C. for a time approximating three minutes to cause rupture of substantially all starch granules, cooling the mixture to a temperature approximating 70° C. to initiate gelatinization thereof, adding bluing comprising Prussian blue in the proportion of approximately 7 cc. per gallon of starch mixture, and aging said cooled starch mixture for from twenty-four to seventy-two hours for substantial completion of hydrolysis of overcooked starch granules, supplying a dispersant and antiseptic comprising pine oil in the proportion of from 5 to 40 grams per gallon of mixture, and boric acid in the proportion of from 2 to 30 grams per gallon of starch mixture, and mechanically breaking up the mixture of said gel, pine oil and boric acid, in the presence of air by atomization, to distribute the pine oil and boric acid uniformly therethrough and to form fine non-coalescent particles preserved by the pine oil and with their oxygen demand supplied by the action of the boric acid and the oxygen in the air to which they are subjected for preventing oxygen uptake by the starch mixture from the bluing and resultant fading.

14. In a method of manufacturing liquid starch, cooking a mixture of starch and water at a suitable temperature and for sufficient time to cause rupture of substantially all starch granules, cooling the mixture to a temperature sufficiently low to initiate gelatinization thereof, aging the gelled mixture for sufficient time for substantial completion of hydrolysis of overcooked starch granules in the gel, and thereafter breaking up the aged gel by atomization with air under pressure to supply an excess of oxygen to the mixture and to break it up into fine, non-coalescent particles and thus satisfying the oxygen hunger of the cooked starch granules and thereby forming a stable liquid starch mixture.

15. In a method of manufacturing liquid starch comprising the steps of mixing cornstarch and water, stirring the mixture while heating to approximately 100 degrees C. for about three minutes, cooling the mixture to approximately 70° C. to form a gel, adding bluing comprising bluing of the type which has less affinity for oxygen than does the mixture of starch and water in the ratio of approximately 7 cc. per gallon of gel, aging the mixture at substantially room temperature for from 24 to 72 hours, adding pine oil in a ratio of approximately 15 gm. per gallon to the aged gel, and adding boric acid in the ratio from 10 gm. to 20 gm. per gallon.

16. In a method of manufacturing liquid starch comprising the steps of mixing cornstarch and water, stirring the mixture while heating to approximately 100 degrees C. for about three minutes, cooling the mixture to approximately 70° C. to form a gel, adding bluing comprising bluing of the type which has less affinity for oxygen than does the mixture of starch and water in the ratio of approximately 7 cc. per gallon of gel, aging the mixture at substantially room temperature for from 24 to 72 hours, and breaking up the gel by atomization at any time following the step of adding bluing.

17. A method of making a starch mixture comprising mixing cornstarch and water, maintaining the mixture at approximately 100° C. for approximately three minutes, cooling the mixture to approximately 70° C. to form a gel, adding a bluing in the ratio of 7 cc. per gallon of the type which has less affinity for oxygen than does the mixture of corn starch and water, aging the gel for from 24 hours up to 72 hours to form a gel, adding pine oil to the mixture in the ratio approximating 15 gm. per gallon, breaking up the gel by atomization at any time following the step of adding bluing.

18. A method of making a starch mixture comprising mixing cornstarch and water, maintaining the mixture at approximately 100° C. for approximately three minutes, cooling the mixture to approximately 70° C. to form a gel, adding a bluing in the ratio of 7 cc. per gallon of the type which has less affinity for oxygen than does the mixture of corn starch and water, aging the gel for from 24 hours up to 72 hours to form a gel, and adding boric acid to the mixture in a ratio of from 10 gm. to 20 gm. per gallon.

19. A method of making a starch mixture comprising mixing cornstarch and water, maintaining the mixture at approximately 100° C. for approximately three minutes, cooling the mixture to approximately 70° C. to form a gel, adding a bluing in the ratio of 7 cc. per gallon of the type which has less affinity for oxygen than does the mixture of corn starch and water, aging the gel for from 24 hours up to 72 hours to form a gel, and adding boric acid to the mixture in a ratio from 10 gm. to 20 gm. per gallon, and then mechanically breaking up and aerating said gel into finely divided non-coalescent particles.

20. A liquid starch mixture comprising starch composed of overcooked starch granules, water, and bluing of the type which has less affinity for oxygen than does the mixture of starch and water aerated to satisfy, at least partially, the oxygen demand of the overcooked starch granules in said mixture.

21. A liquid starch mixture comprising cooked cornstarch composed of overcooked starch granules, water, and bluing of the type which has less affinity for oxygen than does the mixture of starch and water, and boric acid for the purpose of blocking, at least partially, the oxygen demand of overcooked starch granules for preventing oxygen stealing from the bluing.

22. A liquid starch mixture comprising cooked cornstarch composed of overcooked starch granules, water, bluing of the type which has less affinity for oxygen than does the mixture of starch and water, and boric acid for the purpose of blocking, at least partially, the oxygen demand of overcooked starch granules, said mixture being aerated to supply oxygen from the air to complete satisfaction of the oxygen demand of said overcooked starch granules.

23. A liquid starch mixture comprising cooked cornstarch composed of overcooked starch granules, laundry bluing of the type which has less affinity for oxygen than do the overcooked starch granules, and water stabilized by the addition of boric acid for partially blocking the oxygen demand of overcooked starch granules and to which oxygen from the air has been added to aerate the mass sufficiently to complete inhibition of hydrolysis.

24. A liquid starch mixture as defined in claim 23, said aeration being preceded by gelling and aging of said mixture.

25. A liquid starch mixture as defined in claim 23, said aeration being preceded by aging of said mixture sufficient for formation of a gel thereof.

JOSEPH S. PECKER.
EDWIN A. PECKER.

REFERENCES CITED

The following references are of record in the file of this patent:

UNITED STATES PATENTS

| Number | Name | Date |
|---|---|---|
| 1,911,579 | McNeil | May 30, 1933 |
| 2,257,599 | Frischmuth et al. | Sept. 30, 1941 |
| 2,325,573 | Thompson et al. | July 7, 1943 |
| 1,201,062 | Lavedan | Oct. 10, 1916 |
| 579,827 | Higgins | Mar. 30, 1897 |
| 476,320 | Shepherd | June 7, 1892 |
| 2,228,784 | Spilka | Jan. 14, 1941 |
| 1,509,467 | Boidin | Sept. 23, 1924 |
| 1,418,320 | Miller | June 6, 1922 |
| 1,418,274 | Benjamin | June 6, 1922 |
| 1,035,831 | Anderson | Aug. 20, 1912 |
| 707,985 | Tolhurst et al. | Aug. 26, 1902 |

FOREIGN PATENTS

| Number | Country | Date |
|---|---|---|
| 506,501 | Great Britain | May 31, 1939 |